United States Patent [19]

Kawada et al.

[11] 3,855,711

[45] Dec. 24, 1974

[54] GYROCOMPASS

[75] Inventors: Shin-ichi Kawada, Yokohama; Takeshi Hojo, Fujisawa, both of Japan

[73] Assignee: Kabushikikaisha Tokyo Keiki, Tokyo, Japan

[22] Filed: July 31, 1972

[21] Appl. No.: 276,785

[30] Foreign Application Priority Data
 Aug. 10, 1971  Japan.............................. 46-60501
 Aug. 10, 1971  Japan.............................. 46-60504

[52] U.S. Cl. ................................................ 33/327
[51] Int. Cl. ............................................ G01c 19/38
[58] Field of Search .............................. 33/324–327

[56] References Cited
UNITED STATES PATENTS

| | | | |
|---|---|---|---|
| 2,677,194 | 5/1954 | Bishop ........................... | 33/325 UX |
| 3,162,951 | 12/1964 | Hintze et al. ..................... | 33/327 X |
| 3,258,976 | 7/1966 | Krupick et al. ................. | 33/324 UX |

*Primary Examiner*—William D. Martin, Jr.
*Attorney, Agent, or Firm*—Hill, Gross, Simpson, Van Santen, Steadman, Chiara & Simpson

[57] ABSTRACT

A gyrocompass having a gyro case housing a gyro with its spin axis being held substantially horizontal, a container surrounding the gyro case and containing a liquid therein, a first support device supporting the gyro case, a second support device supporting the container with three degrees of freedom, and a servo system causing the container to follow the gyro case about a vertical axis. In this case the gyro case is adapted so that its weight is greater than its buoyancy in a liquid, and the center of buoyancy is coincident with the center of gravity. The first support device is formed with a suspension member which is adapted to couple the upper inside portion of the container with the gyro case so that the latter acts as a pendulum in the container and the coupling point of the suspension member with the gyro case is positioned above the center of gravity of the gyro case, whereby torque proportional to the inclination of the spin axis relative to a horizontal plane and also proportional to the residual weight of the gyro case is produced about an axis perpendicular to a plane including the spin axis and a vertical axis to provide the gyro with a north-seeking action.

10 Claims, 21 Drawing Figures

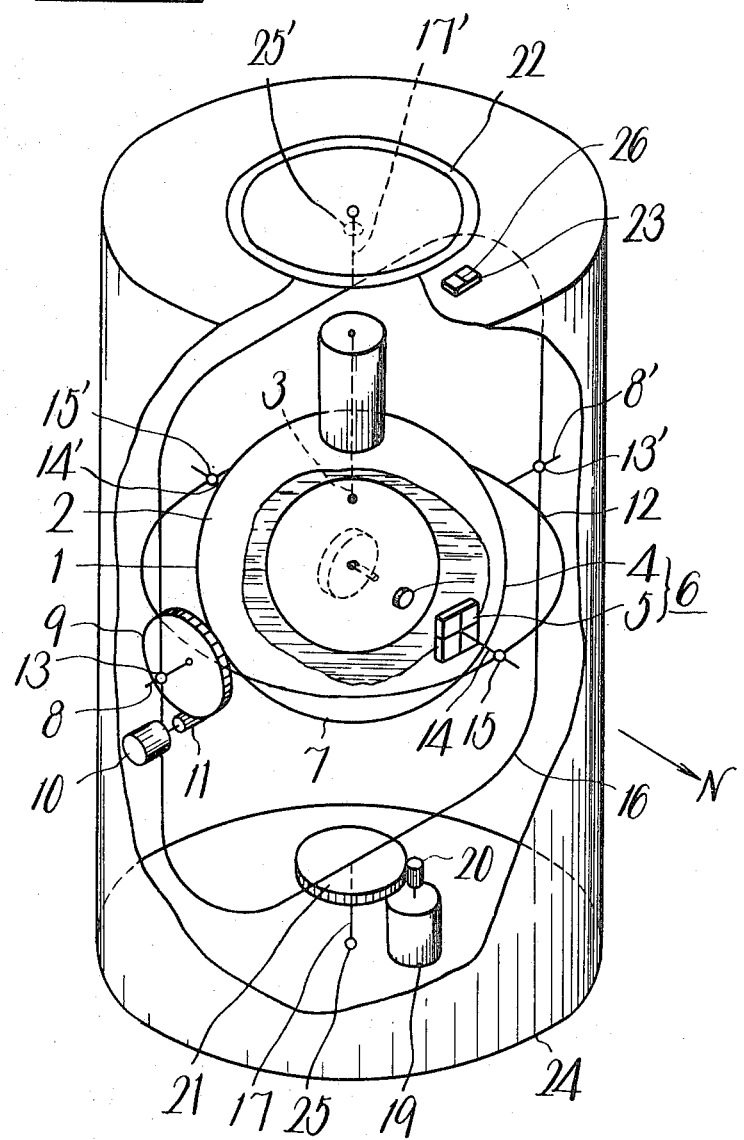

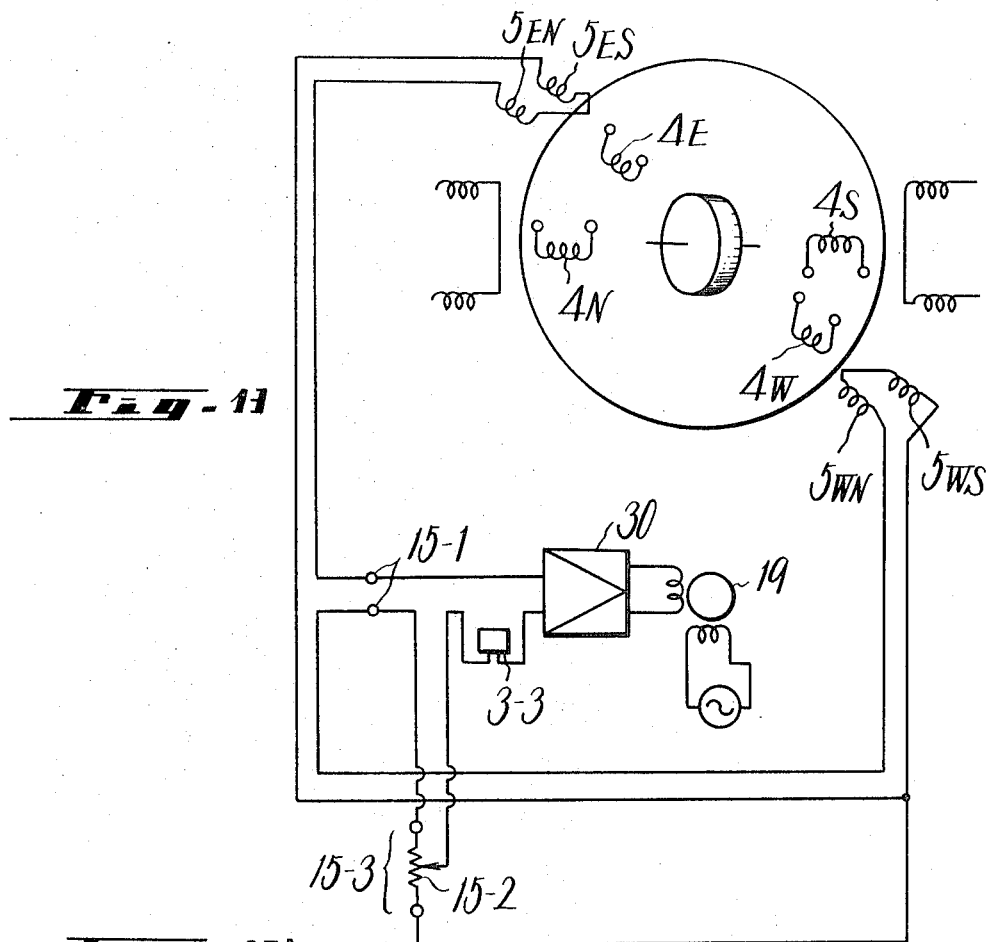
Fig. 11
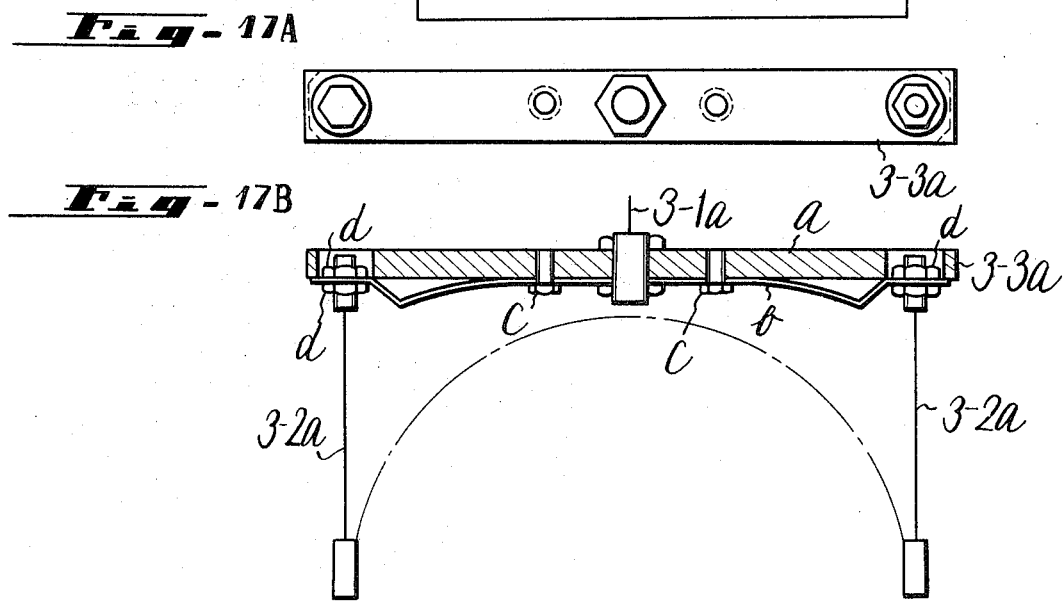
Fig. 17A
Fig. 17B

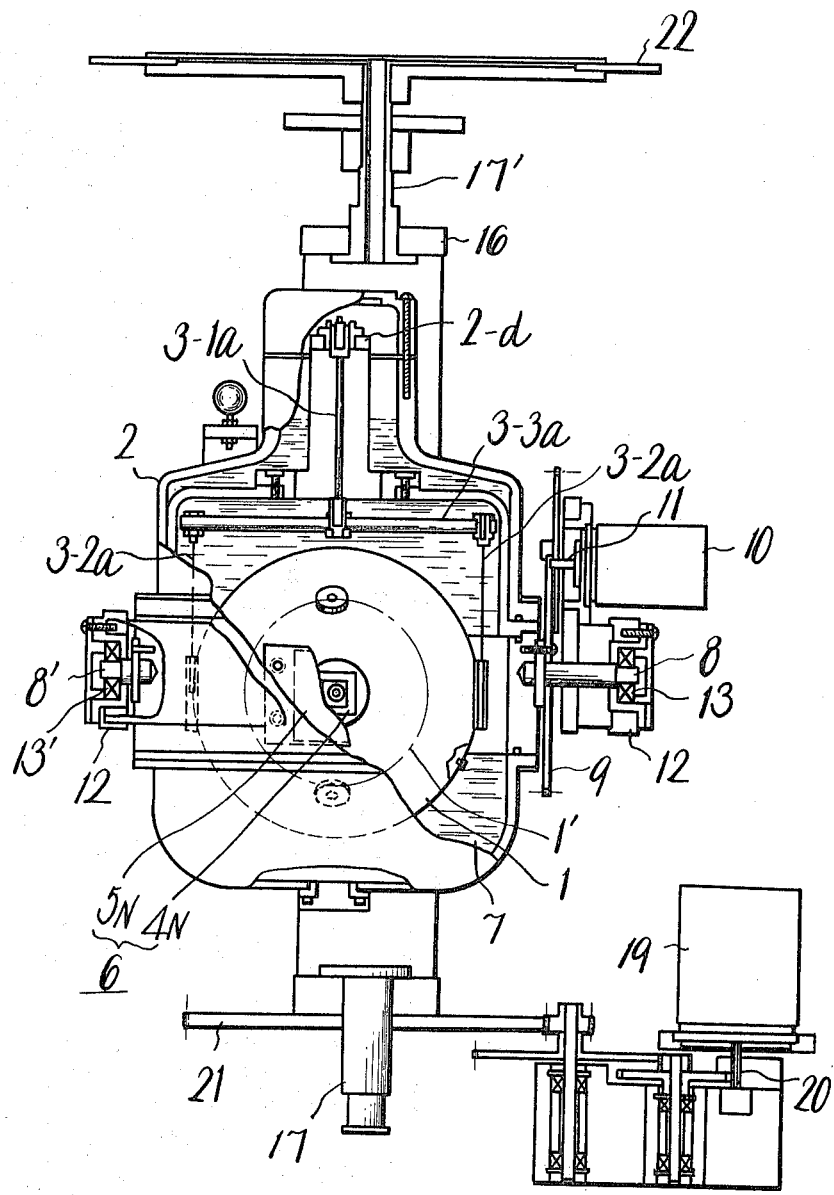

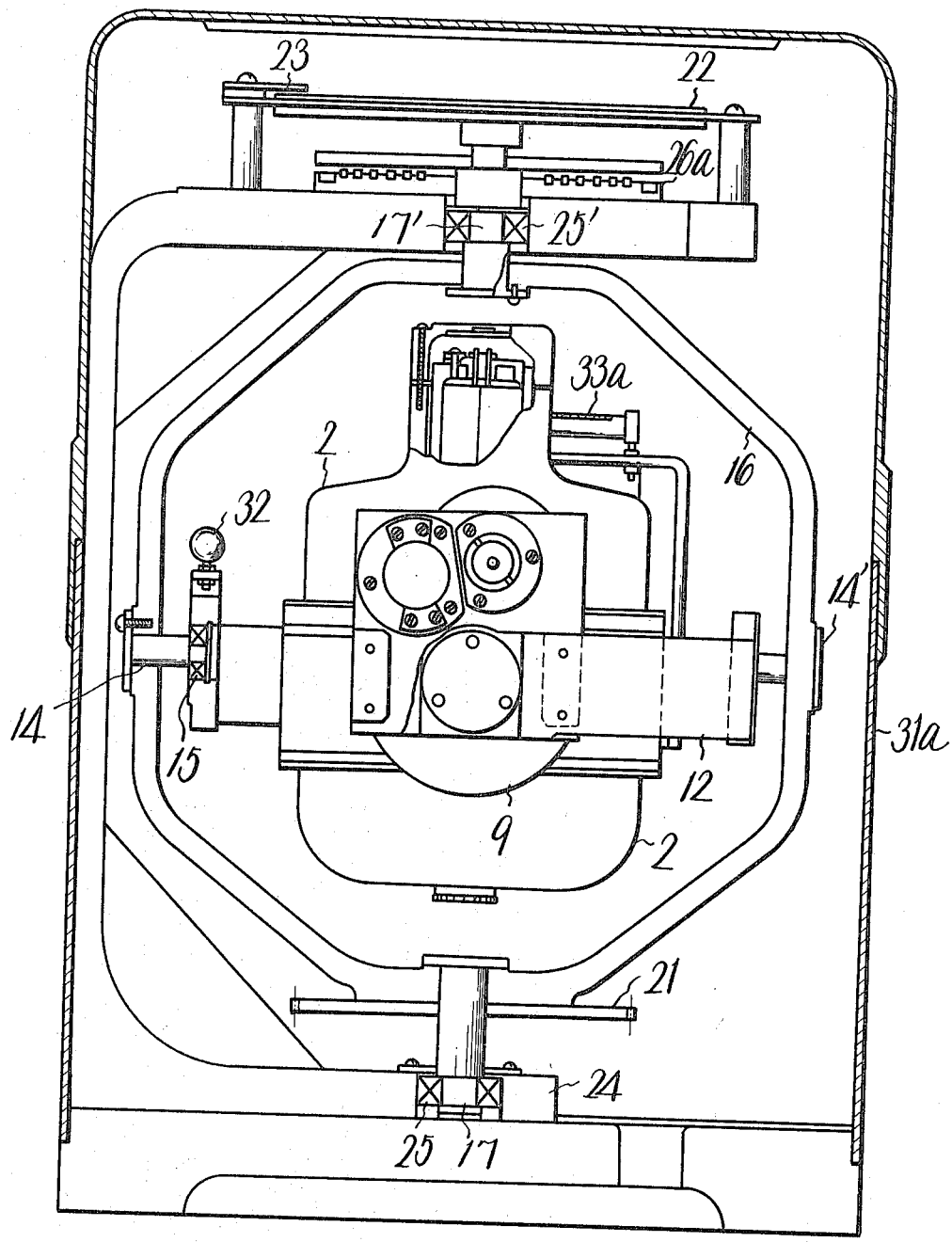

GYROCOMPASS

BACKGROUND OF THE INVENTION

1. Field of the Invention

This invention relates to a gyrocompass, and more particularly to a gyrocompass which is novel in the system for supporting a gyro case housing a gyro therein, as well as the north-seeking system and the damping system.

2. Description of the Prior Art

A gyrocompass is an instrument which is mounted on rolling and pitching vehicles (mainly ships) and provides an indication of their course, and it is desired that it have static and dynamic accuracy. The static accuracy is generally dependent upon how a gyro case with a gyro is supported with minimum friction and, strictly speaking, the static accuracy is determined by the ratio of the angular momentum of the gyro to a detrimental torque such as friction or the like applied to the gyro case. In a known Sperry gyrocompass, a gyro case is supported with a gimbal structure, so that the static accuracy is determined by two vertical shaft bearings and two horizontal shaft bearings. In the Sperry gyrocompass, a method is used wherein the load from the bearings is reduced to substantially zero by immersing the gyro case in oil and by making the buoyancy equal to the gravity of the gyro case. A method is used for removing the load, especially to the vertical shaft bearings by suspending the gyro case with piano wire or the like or a like method is used in combination with a servo system, in order to obtain the required accuracy. Anschutz type gyrocompasses employ a method wherein a spherical housing holds two gyros buoyed in an electrolyte but the two gyros are supported by two vertical shaft bearings respectively within the housing and are associated with each other through a linking mechanism and four to six ball bearings are employed and the frictional torque cannot be completely eliminated which effects the accuracy. Since the static accuracy of the conventional gyrocompasses cannot be rendered independent of the frictional torque of the ball bearings the angular momentum of the gyro used is limited and gyros with angular momentum less than such limit cannot be used. Consequently, using these methods it is impossible to make gyrocompasses more accurate and less expensive than those made at present. Further, in a method employing two gyros a static error is also caused by the difference between the revolutions per minute of the two gyros which results from the difference in the frictional torque of the rotary shaft bearings.

Further, an Arma-Brown gyrocompass employs a gyro case supporting system wherein a gyro case is pulled in four directions by a frame and four piano wires and the assembly is immersed in oil to render the buoyancy of the gyro case substantially equal to zero. This system is excellent in that it does not use bearings for supporting the gyro case and is a north-seeking system of the type wherein the inclination of the gyro spin axis relative to a horizontal plane is detected with the use of an accelerometer and torque is applied to the gyro as a function of the acceleration signal. However, this system is defective in that since the accelerometer is disposed on the output side of a servo system which follows the gyro around the horizontal shaft, a servo error directly has a bad effect on the accuracy of the north-seeking action.

The dynamic accuracy is mainly dependent upon a method for preventing a roll error and the extent to which the error can be prevented. The Sperry gyrocompass employs a method for preventing the roll error which uses a liquid ballistic. The liquid ballistic is indispensable to the Sperry gyrocompass. The Anschutz gyrocompass uses two expensive gyros for preventing the roll error. The Arma-Brown gyrocompass employs an expensive accelerometer and the roll error is eliminated by selecting its time constant to be much greater than the roll period of the ship, and the apparatus is expensive and the accelerometer must be extremely reliable.

SUMMARY OF THE INVENTION

The primary object of this invention is to provide a novel gyrocompass which is entirely free from the aforementioned defects experienced in the conventional gyrocompass.

Another object of this invention is to provide a gyrocompass in which a gyro cass which has a gyro supported without using ball bearings and hence much smaller torque is generated than in conventional gyros.

A further object of the invention is to provide a gyrocompass which has no accelerometer and in which a servo error has no direct influence upon the gyro.

A still further object of the invention is to provide a gyrocompass with no liquid ballistic for preventing roll error.

A yet further object of the invention is to provide a gyrocompass in which only one gyro is required, which is simple in construction, has high accuracy, is cheap at price and is useful for all kinds of ships.

BRIEF DESCRIPTION OF THE DRAWINGS

FIGS. 1 to 3, inclusive, are perspective views, partly cut away, showing examples of this invention respectively;

FIGS. 12 to 15, inclusive, are schematic diagrams showing modifications of a damping device employed in this invention;

FIGS. 17A and 17B are enlarged top and front views showing one example of a suspension member employed in this invention;

FIG. 18 shows a spring depicted in FIG. 17B; and

FIGS. 19 and 20 are side views, partly cut away, illustrating other embodiments of this invention.

DESCRIPTION OF THE PREFERRED EMBODIMENTS

Figure 1:
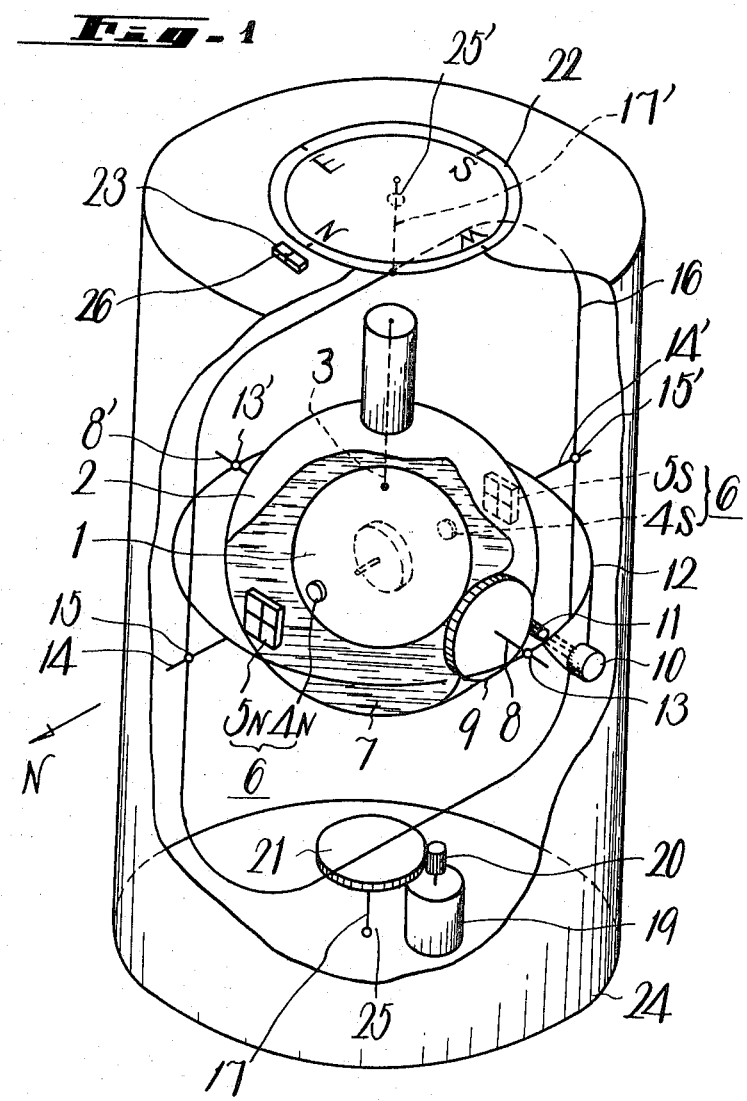
Figure 1B:
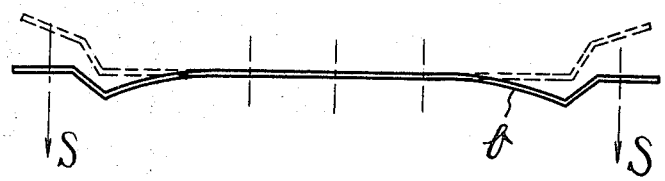

In FIG. 1, reference numeral 1 indicates a gyro case housing therein a gyro rotor rotating at high speed, and the case is liquid-tight. Reference numeral 2 designates a container such as a tank which contains the gyro case 1, and 3 a suspension wire for supporting the gyro case 1, which wire is fixed at the upper end to the tank 2 and at the lower end to the gyro case 1, respectively. Reference numerals 4N, 4S and 5N, 5S respectively identify primary and secondary sides or members of a contactless displacement detecting device 6. The primary sides 4N and 4S are positioned on, for example, the surface of the gyro case 1 at the intersections of the surface of the gyro case 1 with the extension of the spin axis of the gyro, that is, on the north and south sides of the gyro, while the secondary sides 5N and 5S are disposed on the tank 2 in alignment with the primary sides 4N and 4S. Reference numeral 7 denotes a liquid such as a damping oil of high viscosity, for example, a silicon oil which is contained in the tank 2. A pair of horizontal shafts 8 and 8' are attached at one ends to the tank 2 on the equator thereof at positions perpendicular to the spin axis of the gyro and are rotatably fitted at the other ends into bearings 13 and 13' which are disposed on a horizontal ring 12 in alignment with the horizontal shafts 8 and 8'. Reference numeral 10 represents a servo motor for horizontal follow-up, which is attached to the horizontal ring 12. A horizontal gear 9 is mounted about one of the horizontal shafts, for example, shaft 8 and meshes with a horizontal pinion 11 attached to the rotary shaft of the servo motor 10. Gimbal shafts 14 and 14' are attached to the horizontal ring 12 at positions perpendicular to the horizontal shaft bearings 13 and 13' and gimbal shafts 14 and 14' are rotatably supported by gimbal bearings 15 and 15' provided on a follow-up ring 16 in alignment with the shafts 14, and 14' respectively. Follow-up shafts 17 and 17' first ends are secured to the bottom and top of the follow-up ring 16 and their free ends are rotatably inserted into follow-up shaft bearings 25 and 25' disposed on a binnacle 24. An azimuth gear 21 is mounted about one of the follow-up shafts, as for example, shaft 17.

Reference numeral 19 designates an azimuth follow-up servo motor attached to the binnacle 24, and 20 an azimuth pinion affixed to the rotary shaft of the servo motor 19, which pinion meshes with the azimuth gear 21. Reference numeral 22 indicates a compass card secured to the follow-up shaft 17'. Reference numeral 23 represents a reference line plate disposed on the top of the binnacle 24 in association with the compass card 22. The course of the ship equipped with the gyrocompass is read from the combination of reference line 26 drawn on the center of plate 23 and the compass card 22.

Figure 3:
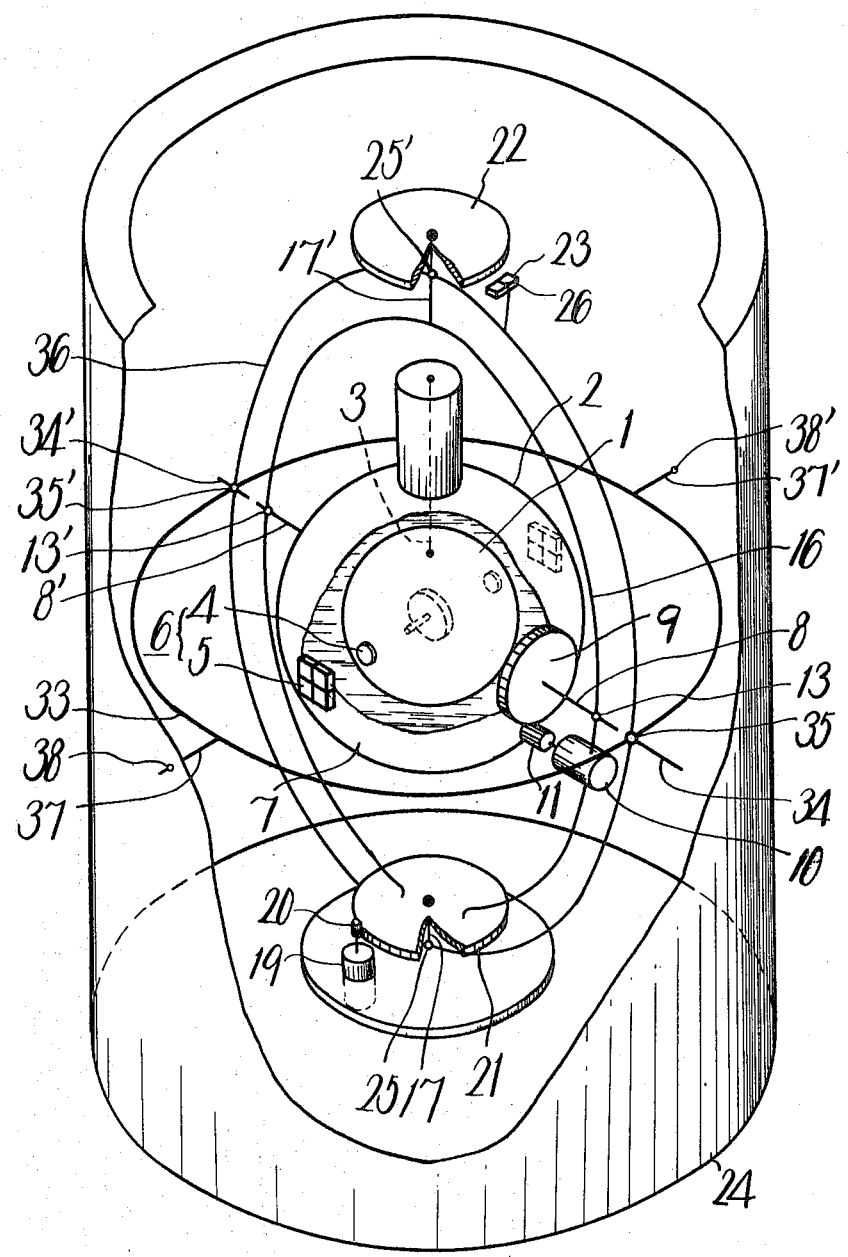

FIGS. 2 and 3 illustrates other examples of this invention in which the same reference numerals as those used in FIG. 1 designate the same components.

In the example of FIG. 2, the gimbal shafts 14 and 14' and the horizontal shafts 8 and 8' are attached to the horizontal ring 12 in a reversed manner to that of FIG. 1. In the example of FIG. 1, the horizontal shafts 8 and 8' extend from the tank 2 and are coupled with the horizontal ring 12, while, in the example of FIG. 2, the gimbal shafts 14 and 14' extend from the tank 2 parallel to the spin axis and are linked with the horizontal ring 12 and the horizontal shafts 8 and 8' are linked with the follow-up ring 16 at positions spaced apart from the gimbal shafts 14 and 14' at an angular distance of 90°. At the same time, the servo motor 10 for the horizontal follow-up is also secured to the follow-up ring 16 and its rotation is transmitted first to the horizontal ring 12 through the horizontal gear 9 and then through the gimbal shafts 14 and 14' to rotate the tank 2, thus achieving horizontal follow-up operation.

In the example of FIG. 3, the horizontal shafts 8 and 8' secured to the tank 2 are rotatably coupled directly to the follow-up ring 16 through the horizontal shaft bearings 13 and 13'. The follow-up ring 16 is coupled through follow-up shaft bearings 25 and 25' to a pitch gimbal 36 which is rotatably disposed on the outside of the follow-up ring 16 by the follow-up shafts 17 and 17'. The pitch gimbal 36 has pitch shafts 34 and 34' at positions spaced apart from the follow-up shafts 17 and 17' at an angle of 90° and the pitch shafts 34 and 34' are rotatably coupled with pitch shaft bearings 35 and 35' provided in a roll gimbal 33 at corresponding positions. The roll gimbal 33 is disposed on the outside of the pitch gimbal 36. The roll gimbal 33 has roll shafts 37 and 37' at positions spaced apart from the pitch shafts 34 and 34' at an angle of 90° and these shafts 37 and 37' are rotatably supported by roll shaft bearings 38 and 38' provided in the binnacle 24. The other structure is constructed the same as that of the enbodiments of FIGS. 1 and 2.

Figure 4:
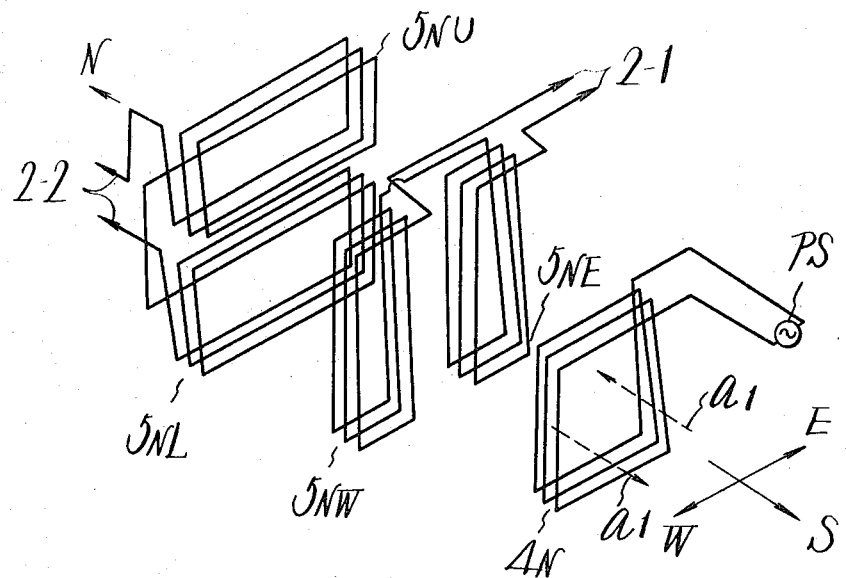
FIG. 4 to 6, inclusive, are schematic diagrams, for explaining a displacement or deviation detecting device and a follow-up system employed therein.
Figure 5:
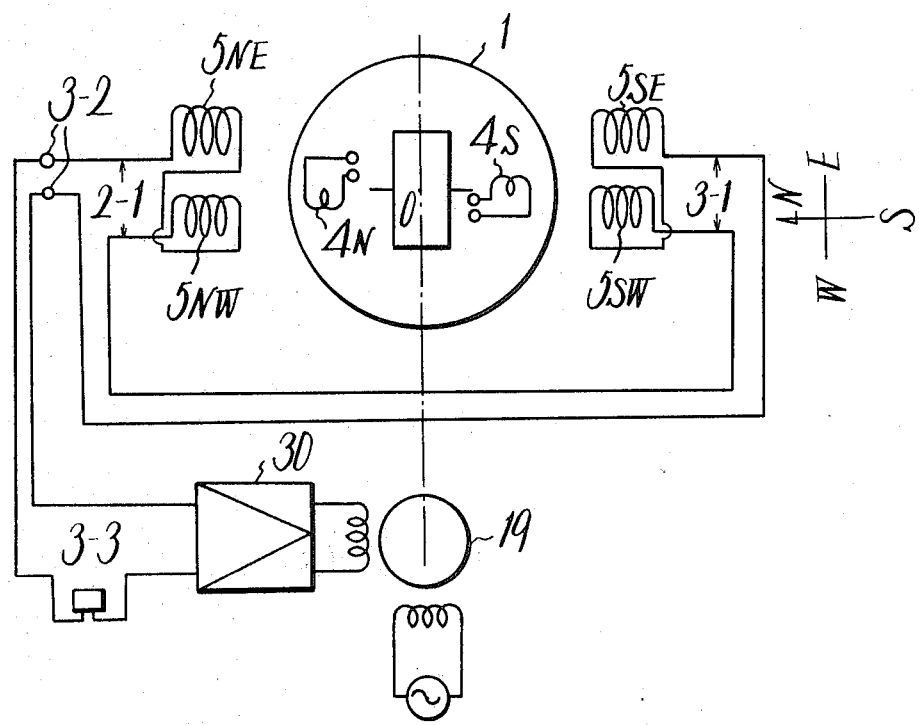

Referring now to FIGS. 4 and 5, a description will be given of one concrete example of the contactless displacement detecting device 6. FIG. 4 shows the N (north) side pairs. As shown in the figure, the primary coil side 4N lies in a plane perpendicular to the spin axis of the gyro and this coil is usually excited by AC current from the common gyro power source PS, which establishes alternating magnetic fields as indicated by broken arrows $a_1$ and $a_1{'}$. The secondary side 5N is made up of four rectangular coils 5NW, 5NE, 5NU and 5NL and one pair of coils, 5NW and 5NE, are disposed side by side and the other pair of coils, 5NL and 5NU, are disposed one above the other. The winding starting ends of the pair of coils 5NW and 5NE and the starting ends of the other pair of coils 5NU and 5NL are interconnected. Assuming that the primary side coil 4N, that is, the gyro case 1, lies at the center of the secondary side coil 5N, that is, the tank 2, a magnetic flux produced by the primary coil 4N passes through the secondary coils 5NW, 5NE, 5NU and 5NL and induce, a voltage in each of them. However, the magnetic flux in each secondary coil is substantially equal to that in the other coils and the respective pairs of coils are connected in a differential manner as described above, so that no voltage will be developed at their output terminals 2–1 and 2–2. Assuming that the primary coil 4N is displaced eastward (indicated by E in the figure), the magnetic flux passing through the coil 5NE increases while that passing through the coil 5NW decreases, so that a voltage is developed at the output terminal 2–1 but no ouput voltage is developed at the terminal 2–2. When the primary coil 4N is displaced westward (indicated by W in the figure), the induced voltage of the coil 5NW increases, while that of the coil 5NE decreases, at the output terminal 2–1 a voltage opposite in phase to that obtained when the primary coil 4N is displaced eastward will be obtained. In this case, since the coils 5NU and 5NL are arranged in a vertical direction, no voltage will be produced at the output terminal 2–2 as in the above case. While, in response to the vertical displacement of the primary coil 4N, equal voltage is induced in the coils 5NW and 5NE which are arranged side by side, an unequal voltage will be induced in the vertical direction, so that an output voltage will be provided at the output terminal 2–2. With the construction shown in FIG. 4, it is possible to detect the displacement of the gyro case 1 in the east-west direction and in the vertical direction relative to the tank 2 on the north end.

FIG. 5 illustrates a device for detecting the displacement of the gyro case in the east-west direction only, with the gyro case 1 being viewed from above. The non-contact displacement detecting device on the south side consists of the primary side coil 4S and secondary side coils 5SE and 5SW. When the gyro case 1 is displaced eastward, the magnetic flux passing through the coil 5SE increases and that passing through the coil 5SW decreases to induce a voltage between terminals 3–1 and the phase of the voltage is the same as that between the terminals 2–1 of the coils 5NW and 5NE. Further, since the coils 5SE, 5SW and 5NE, 5NW are interconnected in a differential manner as depicted in FIG. 5, no voltage is produced between the output terminals 3–2 in response to the displacement of the gyro case 1 in the east-west direction but when the gyro case 1 turns about a vertical axis 0 (normal to the sheet of the drawing, an output voltage reversed 180° in phase is produced between the terminals 3–2 depending upon the turning direction of the gyro case 1. This output voltage is applied to a control winding of the azimuth servo motor 19 through a servo amplifier 30 (which may be omitted). The output of the servo motor 19 is transmitted to the tank 2 through the azimuth pinion 20, the azimuth gear 21, the follow-up ring 16 and the horizontal ring 12 to control the tank 2 in such a manner as to reduce the angular deviation between the tank 2 and the gyro case 1 about the vertical axis O to zero. In whatever azimuth the gyro case 1 may lie, the suspension wire 3 is prevented by the servo system from twisting and any external disturbance torque is impressed from the suspension wire 3 to the gyro about the vertical axis. In FIG. 5, reference numeral 3–3 indicates an error correcting signal generator, which produces a voltage corresponding to the speed or latitude of the ship to make the corresponding angular offset in the follow-up system, by which the suspension wire 3 is twisted to apply torque to the gyro about its vertical axis, thus correcting any error.

Figure 6:
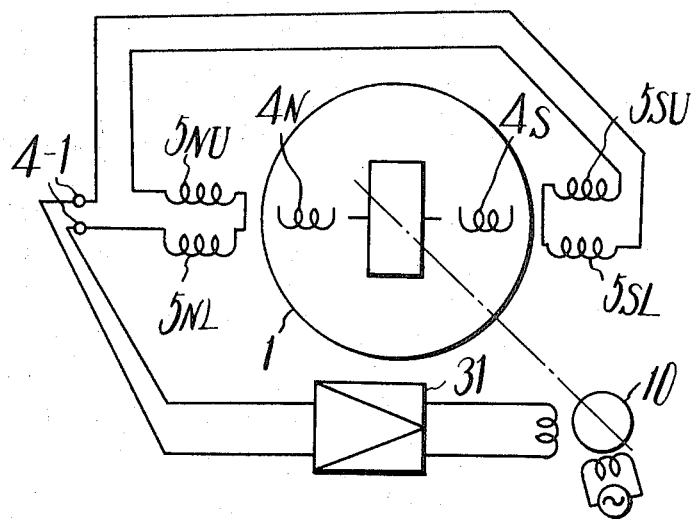

FIG. 6 illustrates a horizontal follow-up system, in which the coils 5NU, 5NL and 5SU, 5SL of the secondary sides 5N and 5S are also interconnected in a differential manner as in FIG. 5, and no output voltage is produced between terminals 4–1 of the coils 5NU and 5NL in response to vertical movement of the gyro case 1 relative to the tank 2 but a voltage is derived between the terminals 4–1 in response to angular movement of the gyro case 1 about a horizontal axis and the voltage produced is applied directly or through a servo amplifier 31 to a control winding of the horizontal follow-up servo motor 10. The rotation of the horizontal follow-up servo motor 10 is transmitted through the horizontal pinion 11 and the horizontal gear 9 to the tank 2 to turn it, reducing the angular deviation between the tank 2 and the gyro case 1 to zero.

Figure 7:
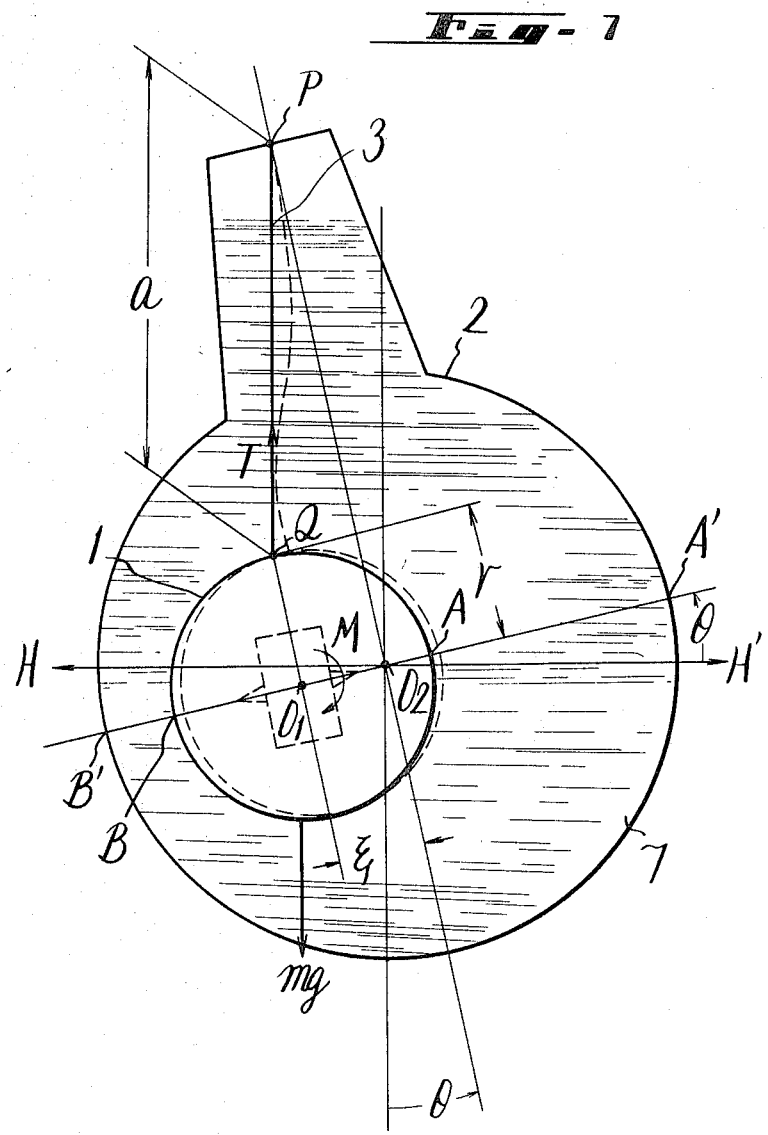
FIGS. 7, 8 and 10, inclusive, are schematic diagrams showing a tank used therein.

FIG. 7 schematically shows the inside of the tank 2 in the case where the north-seeking end A (lying on the gyro case 1) of the extension of the spin axis of the gyro in the gyro case 1 is inclined up at an angle θ relative to a horizontal plane H–H'. In the figure, reference character $O_1$ indicates the center of gravity of the gyro case 1, Q the coupling point of the suspension wire 3 with the gyro case 1, P the coupling point of the suspension wire 3 with the tank 2, and $O_2$ the center of the tank 2. Assume that the spin axis of the gyro rotor in the gyro case 1 is horizontal ($\theta=0$), $O_1$ and $O_2$ coincides with each other. Reference character A designates the north-seeking end and B a point on the gyro case 1 which is diametrically opposite to the north-seeking end A, and A' and B' are points on the tank 2 corresponding to A and B. Since in practice the suspension wire 3 has flexural rigidity it presents a deflection curve such as indicated by broken line in the figure. Accordingly, the amount of axial movement $\xi$ ($O_2 \sim O_1$) of the gyro case 1 relative to the tank 2 decreases extremely slightly but, in practice, this influence is extremely small, so that the following description will be made on the assumption that the suspension wire 3 is completely flexible.

As described previously, the points A' and B' on the tank 2 and those A and B on the gyro case 1 are held in alignment with each other by the operation of the servo system, and consequently the tank 2 is also inclined at the angle θ to the horizontal plane H–H' as is the case with the gyro case 1. Assuming that no external acceleration exists, no external force acts in the direction of the spin axis of the gyro case 1, so that the suspension wire 3 is aligned with the vertical axis. If the tensile force of the suspension wire 3 is taken as T and the residual weight of the gyro case 1 except its buoyancy due to the damper liquid 7 is taken as mg, the tensile force T of the suspension wire 3 provides about the point $O_1$ the following moment M:

$$M = Tr \sin\theta = mg\, r \sin\theta$$

and this moment is applied as torque to the gyro about its horizontal axis (passing through the point $O_1$ and normal to the sheet of the drawing). Here, r represents the distance between the center $O_1$ of gravity of the gyro case 1 and the coupling point Q of the suspension wire 3 with the gyro case 1 as shown in the figure. Also with this method, torque proportional to the inclination of the spin axis to the horizontal plane can be applied to the gyro about its horizontal axis in exactly the same manner as in the case of the conventional gyro compass, so that a gyrocompass can be obtained by selecting the distance r, the residual mass mg and the angular momentum of the gyro and by selecting the period of its north-seeking motion in the range of several tens minutes to one hundred and several tens minutes. In practice, this is equivalent to the distance r becoming a little longer than the practical distance between $O_1$ and Q on account of the flexural rigidity of the suspension wire 3.

The foregoing has described the north-seeking action of the gyrocompass of this invention but, at the same time, the apparatus is required not to produce any roll error in response to periodic horizontal acceleration such as rolling, pitching or the like of the ship, that is, the apparatus is required to have a so-called satisfactory high cut characteristic (low pass characteristic).

Figure 8:
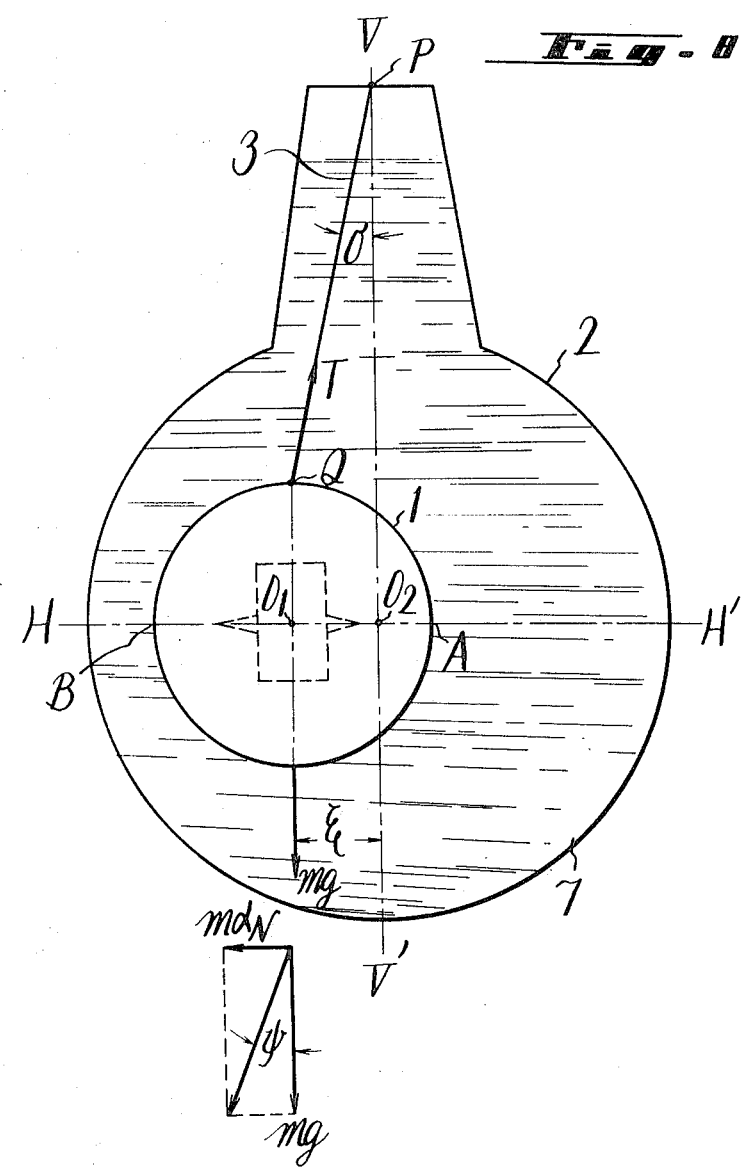
Figure 9:
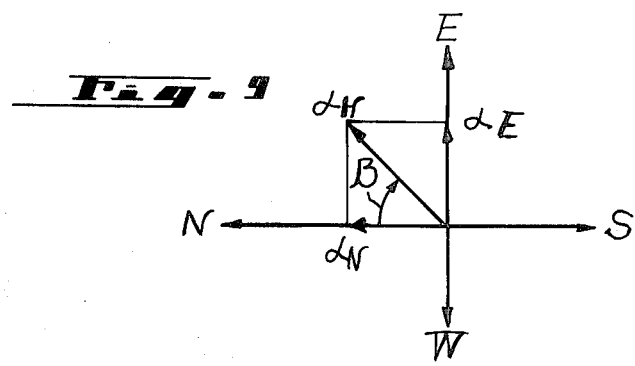
FIG. 9 is a graph, for explaining the operation of this invention.

FIG. 8 shows the case in which horizontal acceleration αH has acted on the gyro in its steady state, with the inside of the tank 2 being viewed from the west side. Let it be assumed that the spin axis lines A and B of the gyro in the gyro case 1 are substantially aligned with the horizontal plane H–H' and the meridian. The horizontal acceleration $\alpha H$ is due to rolling and/or pitching of the ship or the like. Assume that its magnitude changes in a sinusoidal manner with the time. The north-south and east-west components of the horizontal acceleration $\alpha H$ are taken as $\alpha N$ and $\alpha E$ respectively, as depicted in FIG. 9. If the horizontal acceleration $\alpha H$ varies with very long periods in the case of FIG. 8, the gyro case 1 faithfully follows the north-south acceleration $\alpha N$ and an angle $\xi$ between the suspension wire 3 and the vertical line V–V' varies in a sinusoidal manner in the tank 2 such as to always coincide with an angle $\psi$ formed by the north-south acceleration component $\alpha N$ and gravitational acceleration $g$. Also in this case the tensile force T of the suspension wire 3 applies torque M ($M = Tr\sin\sigma \approx Tr\sin\psi \approx mgr(\alpha N/g) = mr\alpha N$) to the gyro about its horizontal axis (passing through the point $O_1$ and normal to the sheet of the drawing). This does not cause any error of the gyro, since the acceleration $\alpha N$ only changes periodically with respect to time.

Figure 10:
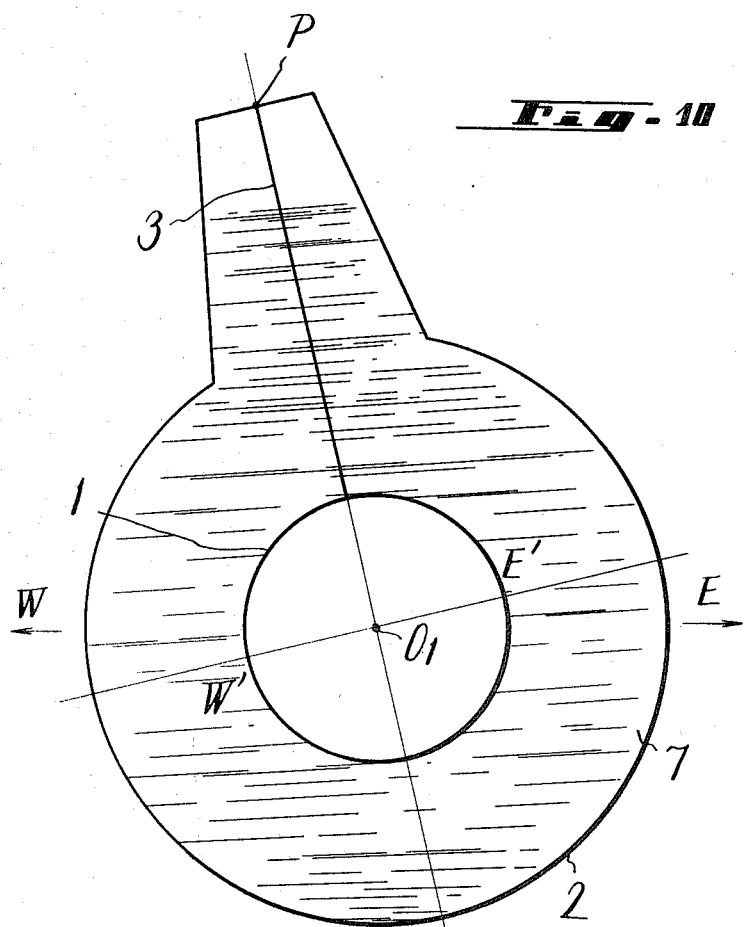
Figure 11:
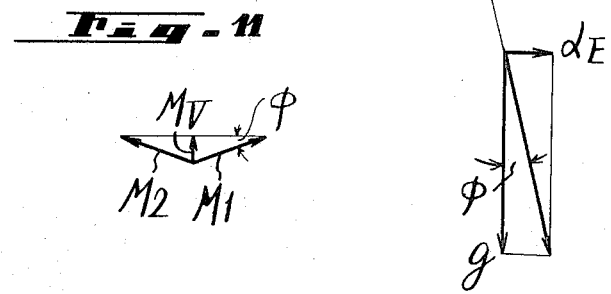
FIG. 11 is a phasor diagram, for explaining the operation of this invention.

FIG. 10 shows the gyro, viewed from the south side, which is subject to the horizontal acceleration $\alpha H$. The tank 2 has a construction of a physical pendulum such that it is heavier at its lower part about the gimbal shafts 14 and 14' as depicted in FIG. 1. Further, the period of this pendulum system is usually 1 to 2 seconds and is much shorter than the roll period of the ship, so that both the suspension wire 3 and the tank 2 periodically swing in the resultant direction of the east-west acceleration $\alpha E$ and the gravitational acceleration $g$ and, as a result of this, the horizontal axis W'E' is also repeatedly inclined. That is, when the horizontal acceleration $\alpha H$ is in the NE quadrant in FIG. 9, torque indicated by $M_1$ in FIG. 11 acts on the gyro and when the acceleration $\alpha H$ is in the WS quadrant, torque $M_2$ acts on the gyro. Therefore, torque $M_{1'}$ remains about the vertical axis in one period and causes an error in the gyro (a roll error).

By the way, the period of actual oscillatory acceleration of almost all existing ships is several to 20 seconds or so and the gyro case 1 and the suspension wire 3 form one simple pendulum with respect to the north-south direction, so that the gyro case 1 cannot respond to horizontal acceleration of a period shorter than at least the free period of this pendulum system and it is more important that the movement of the gyro case 1 in the north-south direction relative to the tank 2 be extremely limited by the viscous resistance of the damper oil 7 to the gyro case 1. Let it be assumed that the center of viscous force to the gyro case 1 coincides with the center of gravity $O_1$. Therefore, the gyro case 1 and the tank 2 move substantially as a unitary structure (that is, $O_2$ and $O_1$ coincide with each other) in response to the periodic horizontal acceleration $\alpha N$ due to normally possible rolling of the ship and the angle $\sigma$ in FIG. 8 is substantially zero, so that the tensile force T of the suspension wire 3 does not produce any moment about the horizontal axis $O_1$, and consequently, the so-called roll error is not produced. The viscosity of the damper oil 7 can be so selected as to exert substantially no influence upon acceleration with long periods such as the north-seeking period (for example, about 84 minutes) of the gyrocompass and so on and no trouble occurs in the north-seeking action.

A description will be made of a damping device of the gyrocompass of this invention. The basic principle of the damping device is that torque proportional to the inclination of the spin axis of the gyro from the horizontal plane is applied to the gyro about its vertical axis, which principle has already been utilized in many conventional gyrocompasses. The damping device of this invention relates to means for embodying the principle. Where the spin axis of the gyrocompass constructed as described previously in connection with FIGS. 1 to 7 is inclined at an angle $\theta$ to the horizontal plane H–H', the tank 2 is also inclined by the action of the horizontal follow-up system by the same angle $\theta$ as the gyro in the gyro case 1 and the gyro case 1 moves by $O_2 - O_1 = \xi$ in the direction of B' until the suspension wire 3 coincides with the vertical line and then the gyro case 1 stands still. In other words, the inclination angle $\theta$ of the gyro and the amount of movement $\xi$ of the gyro case 1 in the direction of the spin axis relative to the tank 2 are completely proportional to each other. Consequently, a desired damping action can be obtained by electrically detecting the amount of movement $\xi$, biasing the following position of the vertical follow-up system in accordance with the detected amount and by twisting the suspension wire 3.

Figure 12:
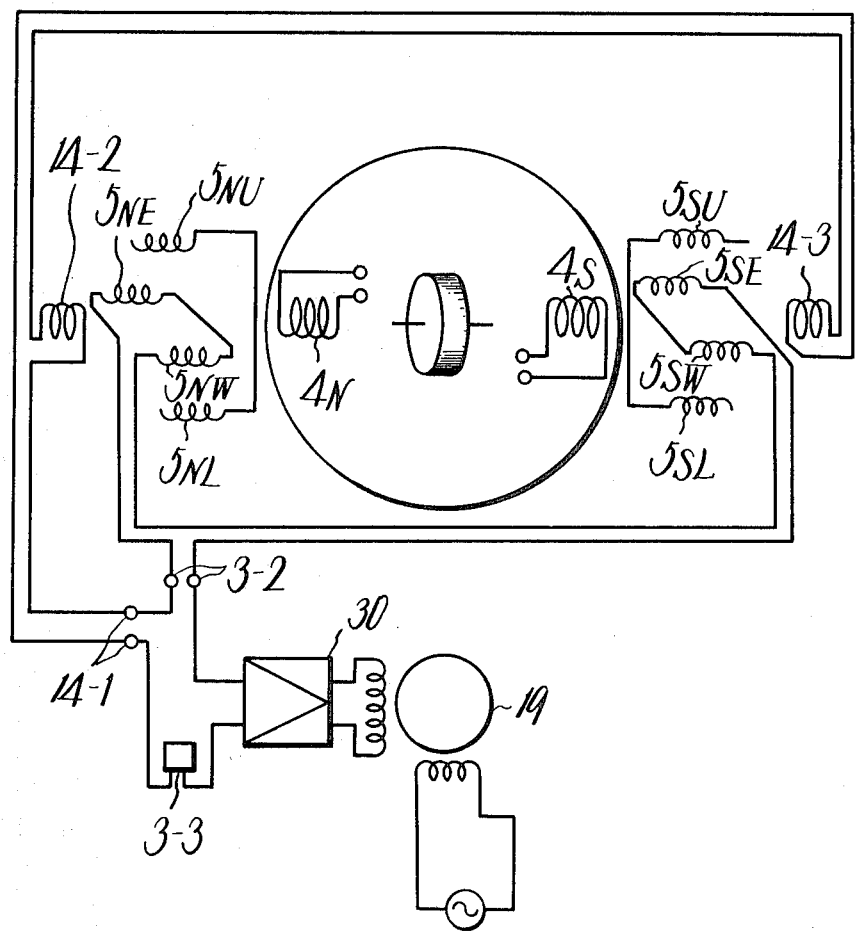

FIG. 12 illustrates a concrete embodiment of this invention with the above principle being applied to the FIG. 5 example. In the present embodiment, two coils 14–2 and 14–3 are additionally provided on the north and south sides of the secondary side coils 5N and 5S of the contactless displacement detecting device 6 in such a manner that the faces of the windings of the coils 14–2 and 14–3 may lie parallel with the two paris of coils 5NE, 5NW and 5SE, 5SW. The coils 14–2 and 14–3 are interconnected in a differential manner and their output ends 14–1 are additively connected to the signal terminals 3–2 of the vertical follow-up system and then connected to the control winding of the azimuth servo motor 19 through the servo amplifier 30. In this case, the vertical follow-up system produces a servo error corresponding to a signal voltage between the terminals 14–1 which is proportional to $\xi$, providing an angular offset in azimuth between the tank 2 and the gyro case 1 corresponding to the signal between the terminals 14–1. Accordingly, the suspension wire 3 is twisted in proportion to $\xi$ and since this twisting torque is proportional to $\xi$, it is proportional to the inclination angle $\theta$ of the gyro spin axis, and consequently it is possible to apply a damping action of the gyro.

FIG. 13 shows another embodiment of the damping device of this invention, in which, in addition to the primary coils 4N and 4S of the contactless displacement detecting device 6, another pair of primary coils 4E and 4W are provided on the east and west sides of the gyro case 1, other secondary coils 5EN, 5ES and 5WN, 5WS are provided on the tank 2 at positions corresponding to the primary coils 4E and 4W and the coils 5EN and 5ES on the east side and 5WN and 5WS on the west side are interconnected in a differential manner, respectively. Thus, in the case where the gyro case 1 turns about the vertical axis relative to the tank 2, a voltage signal is derived between output terminals 15–1 of the above-mentioned coils and the voltage signal is applied to the control winding of the vertical follow-up servo motor 19 through the servo amplifier 30, thereby establishing the vertical follow-up system. While, voltages due to the movement of the gyro case 1 in the north-south direction relative to the tank 2 are provided at differential output terminals of the east-side coils 5EN and 5ES and the west-side coils 5WN and 5WS respectively, so that when the voltages of the coils 5WS and 5WN are used, a voltage corresponding to $\xi$ in FIG. 7 (that is, corresponding to the inclination angle $\theta$ of the gyro) is derived between both ends 15-3 of a voltage divider 15-2. Accordingly, by applying this voltage through the voltage divider 15-2 to the aforesaid output terminal 15-1 to control the servo motor 19 through the servo amplifier 30, the suspension wire 3 is twisted corresponding to $\xi$ to provide damping action. Of course, it is possible to produce a voltage signal by adding the generated voltages of the coils 5WN and 5WS and those of the coils 5EN and 5ES by means of an operational amplifier, a transformer or the like and add this signal to the input of the servo amplifier after it is adjusted by a voltage divider or the like as required, as will be described later in connection with FIG. 15. This method is more accurate.

Figure 14:
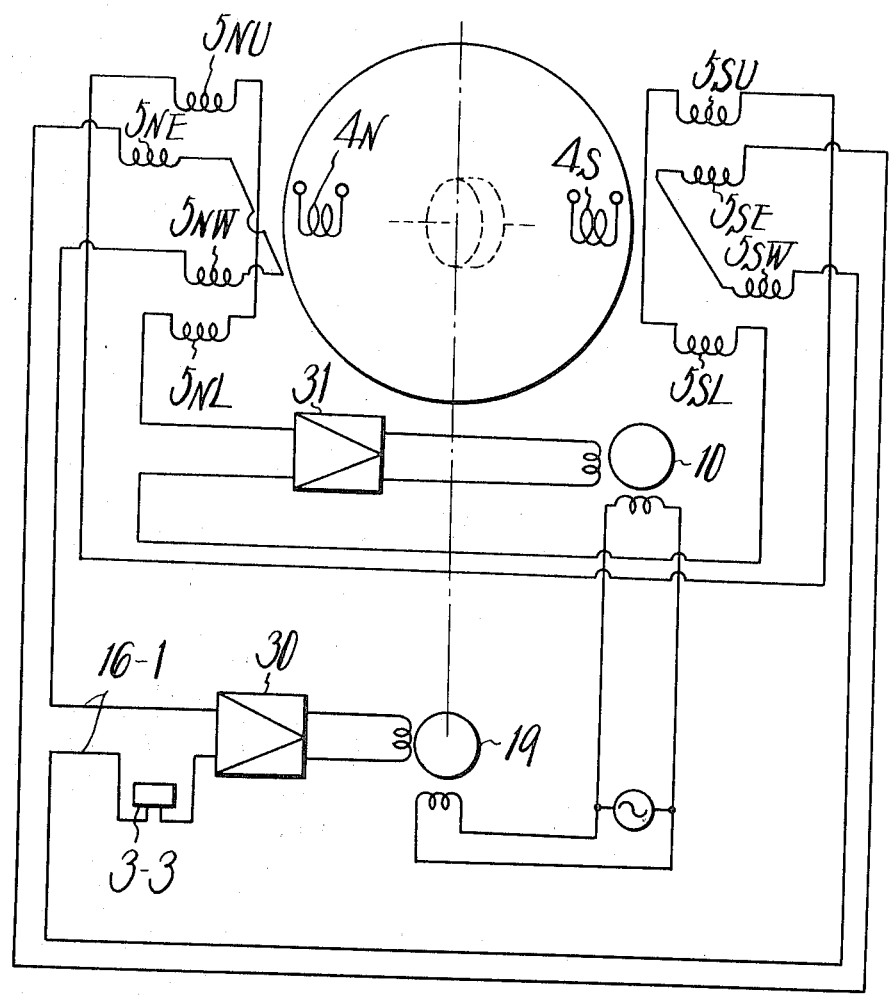

FIG. 14 illustrates another embodiment of the damping device of this invention, in which the number of turns of, for example, the east-side coils 5NE and 5SE of the contactless displacement detecting device 6 for azimuth (or vertical) follow-up use in the FIG. 3 example is selected smaller than that of the west-side coils 5NW and 5SW. Even if the numbers of turns of the east- and west-sides coils are different from each other as mentioned above, the coils of both sides are interconnected in a differential manner, respectively, and these coils are further connected to each other differentially. This is exactly equivalent to that where the coils 5SE and 5NE and 5SW and 5NW are differentially connected to each other, respectively, and then the east- and west-side coils are differentially connected to each other. If the gaps between the primary and secondary coils of the north-south displacement detecting device are equal on the north and south sides, the follow-up position in this case is exactly the same as that where the numbers of turns of the coils are equal to each other and no voltage is generated between output terminals 16-1 as long as the spin axis of the gyro case 1 and a line joining the centers of the secondary coils are parallel to each other. By the way, where the gaps between the primary and secondary coils are different on the north and south sides, that is, for example, where the south side is lower and the gyro case 1 moves by $\xi$ in the south direction relative to the tank 2, the gap between the coils on the south side is narrower than those on the north side, and the induced voltage in the coils of the south side rise as compared with that on the north side. Since the number of turns of the coils of the west side is greater than that of the coils of the east side, the differential output of the west-side coils 5NW and 5SW becomes greater than that of the east-side ones and a direction in which the electromagnetic coupling between the coil 5SW of the greatest output and the primary coil 4S is weakened, that is, a position where the tank 2 is moved upwards (to the right) by a certain angle relative to the gyro case 1, becomes a new follow-up point. This method also provides damping action as in the foregoing two examples. In the foregoing examples the servo amplifiers 30 and 31 are employed but when the output of the contactless displacement detecting device 6 is sufficiently large and the gear ratio is high, the motor may be small, and the servo amplifiers 30 and 31 are not always required and the contactless displacement detecting device 6 may directly control the motor in some cases.

Figure 15:
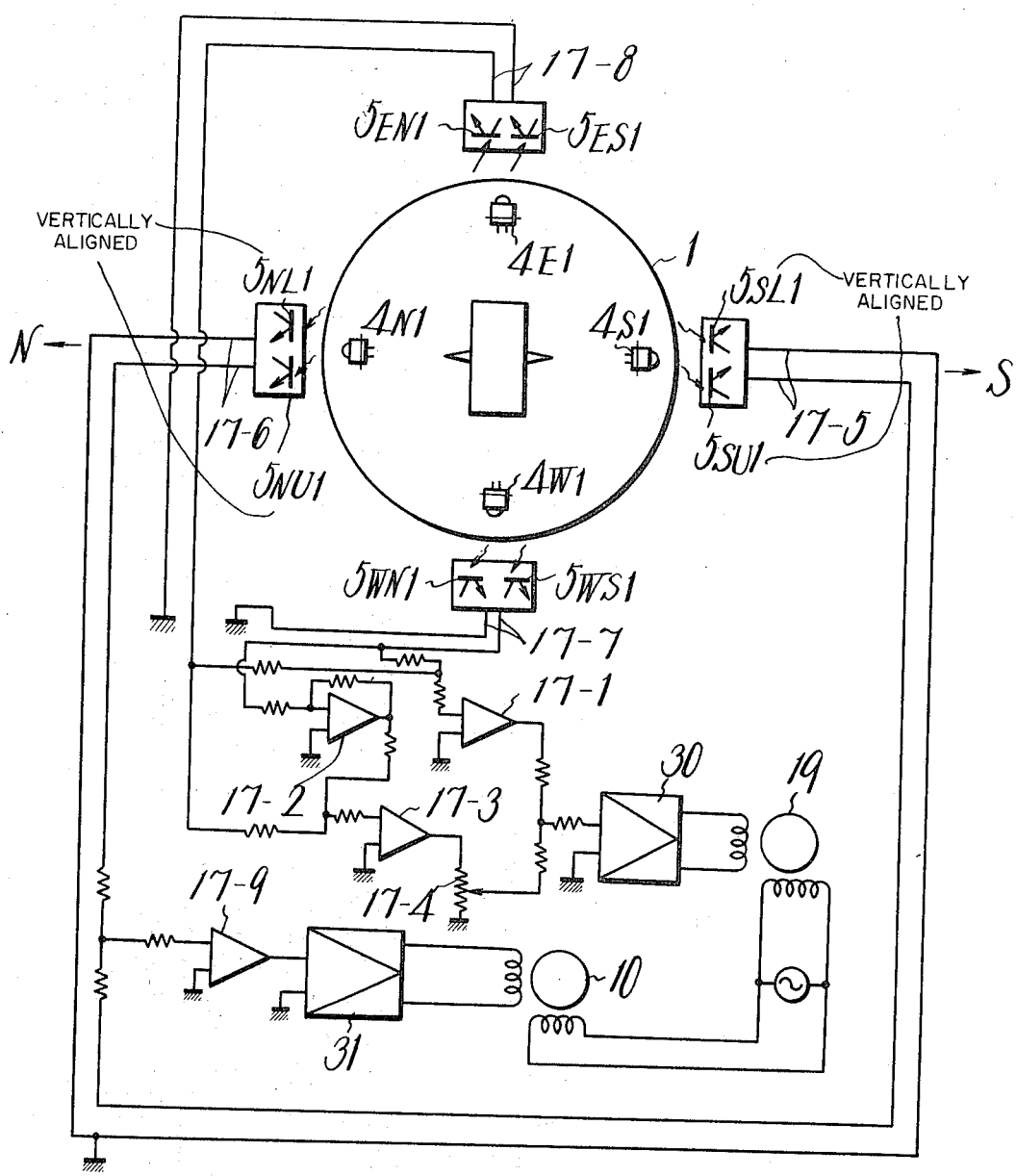

FIG. 15 shows another embodiment of the damping device of this invention. In the present example, luminous elements 4N1, 4S1, 4E1 and 4WI such as luminescent diodes or the like are provided on the gyro case 1 at its east, west, north and south positions in place of the aforesaid primary coils 4N, 4S, 4E and 4W and light receiving elements 5NL1, 5NU1, 5SL1 and 5SU1 are disposed on the tank 2 at the positions corresponding to the luminous elements in a vertical direction and other light receiving elements 5EN1, 5ES1 and 5WN1, 5WS1 are arranged in a horizontal direction. In this case, the light receiving elements 5SL1, 5SU1 and 5NL1, 5NU1 are differentially interconnected, respectively, and their differential outputs 17-5 and 17-6 are subtracted with an operational amplifier 17-9, and the output is applied through the servo amplifier 31 to the control winding of the horizontal follow-up servo motor 10, thus achieving horizontal follow-up operation. Further, the differential outputs 17-7 and 17-8 of the differentially connected light receiving elements 5ES1, 5EN1 and 5WS1, 5WN1 correspond to the movement of the east and west ends of the gyro case 1 in the north-south direction, so that when the outputs are applied to a comparator 17-1 its output becomes a main vertical follow-up signal. While, if the differential output 17-7 is applied to an adder 17-3 together with the differential output 17-8 after the polarity of the former is reversed, the output of the adder 17-3 corresponds to the amount of movement $\xi$ of the gyro case 1 in the north-south direction relative to the tank 2. Accordingly, the output of the adder 17-3 is added through a voltage divider 17-4 to the output of the comparator 17-1 and the added output is applied through the servo amplifier 30 to the control winding of the azimuth servo motor 19, which twists the suspension wire 3 corresponding to the inclination of the gyro relative to the horizontal plane to apply torque to the gyro about its vertical axis, thus effecting damping of the north-seeking action of the gyro. In the present example, the additive and substractive operations are achieved with the use of the operational amplifier but it will be evident that when the signal is AC as in the example of FIG. 13, such operations can be effected by means of an operational amplifier or a transformer.

Although the foregoing examples have been described in connection with the cases where electromagnetic coupling exists between the coils, and the luminous and light receiving elements are used as the contactless displacement detecting device respectively, the damping device of this invention need not be so specifically limited. For example, a detecting device employing a Hall element, a detecting device adapted to detect a change in the capacitance of a capacitor or the like can also be used. Any device can be used, so long as it biases the follow-up point of the azimuth follow-up servo system corresponding to the amount of movement of the gyro case 1 in the north-south direction relative to the tank 2 to twist the suspension wire, thereby providing damping action for the north-seeking operation of the gyro.

As will be apparent from the foregoing, according to this invention, the damping operation can be achieved with an extremely simple and inexpensive method and since the damping operation is carried out electrically, it is possible to adjust the amount of damping and achieve easily damping cutoff which is used in warships at the time of turning or the like and, expensive devices such as accelerometers are not required for detecting the inclination of the gyro.

The following will decribe a further improved concrete construction of the suspension wire employed in FIGS. 1 to 3. In the case of the apparatus described previously in connection with FIG. 1, when the spin axis of the gyro motor is inclined, restoring torque is produced by gravity which is proportional to the effective mass corresponding to the difference between the total mass of the gyro case 1 and the total buoyancy of the gyro case 1 by the damper oil 7, the length $r$ of the arm, that is, the distance between the center of gravity $O_1$ and the connection point Q of the suspension wire 3 with the gyro case 1 in FIG. 7 and the aforementioned inclination angle, and the restoring torque acts on the gyro. The axis of the gyro to which this restoring torque is applied is prependicular to the plane including the spin axis and the direction of gravity as described previously in connection with FIG. 7. In order to construct the gyrocompass of this invention with the depicted apparatus by making the restoring torque equal to the torque necessary for north-seeking action of the gyrocompass, it is necessary to suitably select the effective mass of the gyro case by adjusting its buoyancy because the length $r$ of the arm is substantially equal to the radius of the gyro case 1, and such a procedure is inconvenient for design purposes. Further, an increase in the buoyancy generally leads to bulkiness of the gyro case 1 and increases the manufacturing cost.

Figure 16:
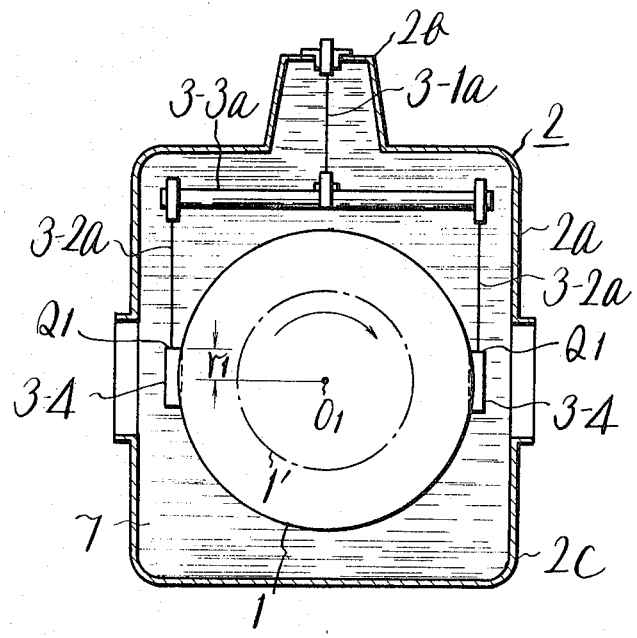
FIG. 16 is a schematic diagram illustrating one example of a gyro supporting device used in this invention.

FIG. 16 illustrates one embodiment of this invention which employs a gyro case supporting device free from such defects as mentioned above. With this device, the mass of the gyro case and the buoyancy applied thereto can be freely be selected and, by determining the length $r$ of the arm, restoring torque which complies with the requirements of many gyro apparatuses can be easily obtained.

With reference to FIG. 16 the above-mentioned embodiment of the gyro supporting device will hereinbelow be described.

In the figure, reference numeral 1 indicates a gyro case housing therein a gyro rotor 1' revolving at high speed as in the foregoing examples. A tank 2 in this example, consists of, for example, three tank members. The space between the tank 2 and the gyro case 1 is filled with damper oil 7 as described previously. In the example of FIG. 16, the suspension wire or member is made up of an upper suspension wire 3–1a, two lower suspension wires 3–2a and 3–2a and a suspension bar 3–3a for coupling the suspension wires 3–1a, 3–2a and 3–2a. The upper end of the upper suspension wire 3–1a is fixed to a frame 2b on the top 2a of the tank 2 and the lower end is fixed to the suspension bar 3–3a at a substantially central point. The upper ends of the lower suspension wires 3–2a and 3–2a are coupled to both ends of the suspension bar 3–3a and their lower ends are coupled to mounting means 3–4 and 3–4 at points $Q_1$ and $Q_1$ thereon which are mounted on the peripheral surface of the gyro case 1. It is also possible to omit the mounting means 3–4 and 3–4 and fix the lower ends of the suspension wires 3–2a and 3–2a directly to the gyro case 1.

In the case when a single suspension wire as described previously in connection with FIGS. 1, 2, 3, 7, 8 and 10 is used, the vertical distance between the coupling point of the suspension wire with the gyro case and the center of gravity of the gyro case cannot usually be selected smaller than the radius of the gyro case unless the gyro case is made in a special configuration. However, where the suspension wire is divided into upper and lower portions as described above, no limitation is set on the selection of the coupling points of the gyro case 1 with the lower suspension wires 3–2a and 3–2a and the distance $r_1$ between the center of gravity $O_1$ and the point $Q_1$ of the gyro case 1 can be selected as desired, so that the gyrocompass of this invention can be easily realized merely by changing the length of the arm $r_1$. Since it is sufficient to make the gyro case 1 liquid-tight, the gyro case 1 can be designed to have minimum volume and this contributes greatly to the reduction of the size of the apparatus.

In the above example, the suspension wires 3–1a, 3–2a and 3–2a may also be formed with one metallic wire or thread but may be formed from a bundle of several metallic wires or threads and, further, strip-like members may also be used. In short, no limitation is imposed on the construction of the suspension wire so long as it can suspend the gyro case 1 to attain the object of this invention.

FIGS. 17A and 17B are enlarged front and side views showing the construction of one example of the suspension bar 3–3a. As illustrated in the figures, the suspension bar 3–3a consists of a bar proper $a$ and a plate spring $b$ fixed thereto, for example, by means of screws $c$. The two lower suspension wires 3–2a and 3–2a are fixed, for example, by nuts $d$ and $d$ to both end portions of the plate spring $b$ at their upper ends.

FIG. 18 shows only the spring $b$ depicted in FIG. 17B. The spring $b$ is formed such that, in its free condition, the central portion is flat and the both end portions are bent as indicated by broken lines in the figure. Accordingly, when the spring $b$ is assembled with the bar proper $a$, downward load S is previously applied to the bent portions. The load S is selected to be greater than the tensile force caused by the acceleration encountered in normal navigation and the bar proper $a$ and the plate spring $b$ act as an unitary body. When subjected to such a great acceleration that the suspension wires 3–1a, 3–2a and 3–2a are broken, the suspension spring $b$ serves as a spring to prevent breakage of the suspension wires 3–1a, 3–2a and 3–2a.

In the above example, use is made of the spring to which load is previously applied but the suspension bar 3–3a itself can be made with one spring and, also in this case, the aforementioned object can be attained.

FIGS. 19 and 20 illustrate examples of this invention embodying all the novel techniques described. In the figures, the same reference numerals as those in FIGS. 1 and 16 identify the same components. In FIG. 16, the upper end of the suspension wire 3–1a is directly attached to the tank 2, while, in FIG. 19, the suspension wire 3–1a is attached to a suspension member 2–d fixed to the tank 2. In FIG. 20, reference numeral 26a indicates a slip ring, 31a an outer case, and 32 and 33a spirit levels for detecting the horizons for the horizontal ring 12 and the tank 2, respectively.

The important constructional features of this invention will be apparent from the foregoing and they are summarized as follows:

1. A small and compact gyrocompass can be obtained. This invention does not require the liquid ballistic which is indispensable to the conventional Sperry gyrocompass. Further, it is not necessary to make the specific gravity of the gyro case 1 coincident with that of a support liquid as in other float-type gyros, so that the gyro case can be made extremely small, as compared with the conventional gyros. Further, it is unnecessary to use two gyros.

2. A high precision gyrocompass can be obtained. No mechanical contact elements such as ball bearings or the like are used, even if a gyro of small angular momentum is employed, a high precision gyrocompass can be obtained.

3. The gyrocompass of this invention is purely mechanical and simple in mechanism as a north-seeking apparatus, and hence is highly reliable. Further, the north-seeking torque is produced by the gyro itself, so that there is no lowering of accuracy due to a servo error and the dead zone of an accelerometer.

4. The gyrocompass of this invention can be made small and an expensive accelerometer is not used, so that a high precision gyrocompass can be produced at a relatively low cost.

5. While the gyro is in its standstill condition, the spin axis of the gyro is held horizontal, so that the setting time of the gyro for subsequent operation is shorter than that of other gyrocompasses and this is highly useful in practice.

It will be apparent that many modifications and variations may be effected without departing from the scope of the novel concepts of this invention.

We claim as our invention:

1. A gyro compass comprising a gyro case housing therein a gyro with its spin axis being held substantially horizontal, a container surrounding the gyro case and containing a liquid therein, first support means for supporting the gyro case in the container, second support means for supporting the container with three degrees of freedom, and servo means for causing the container to follow up the gyro case about an axis in a direction of gravity, characterized in that the gyro case is adapted so that its weight is greater than the buoyancy applied thereto by the liquid; the center of buoyancy is coincident with its center of gravity; the first support means comprises a flexible suspension member; the suspension member coupling the upper inside of the container with the gyro case so that the latter acts as a pendulum in the container; and the coupling point of the suspension member with the gyro case is positioned higher than the center of gravity of the gyro case, whereby torque proportional to the inclination of the spin axis of the gyro relative to a horizontal plane and also proportional to the residual weight of the gyro case is produced about an axis perpendicular to a plane including the spin axis of the gyro and a line of gravity therethrough to provide the gyro with a north-seeking action, wherein the second support means comprises a pair of horizontal shafts attached to the container along an axis perpendicular to a plane including the spin axis of the gyro and a line of gravity therethrough, a horizontal gimbal ring having a pair of bearings rotatably supporting the pair of horizontal shafts and a pair of normally horizontal gimbal shafts along an axis substantially perpendicular to the pair of bearings, the horizontal ring being disposed outside of the container, a follow-up ring having a pair of bearings rotatably supporting the pair of gimbal shafts and a pair of follow-up shafts along an axis substantially perpendicular to the pair of gimbal shaft bearings and normally in the vertical direction, the follow-up ring being disposed outside of the horizontal ring, and a binnacle having a pair of bearings rotatably supporting the pair of follow-up shafts.

2. A gyro compass comprising a gyro case housing therein a gyro with its spin axis being held substantially horizontal, a container surrounding the gyro case and containing a liquid therein, first support means for supporting the gyro case in the container, second support means for supporting the container with three degrees of freedom, and servo means for causing the container to follow up the gyro case about an axis in a direction of gravity, characterized in that the gyro case is adapted so that its weight is greater than the buoyancy applied thereto by the liquid; the center of buoyancy is coincident with its center of gravity; the first support means comprises a flexible suspension member; the suspension member coupling the upper inside of the container wth the gyro case so that the latter acts as a pendulum in the container; and the coupling point of the suspension member with the gyro case is positioned higher than the center of gravity of the gyro case, whereby torque proportional to the inclination of the spin axis of the gyro relative to a horizontal plane and also proportional to the residual weight of the gyro case is produced about an axis perpendicular to a plane including the spin axis of the gyro and a line of gravity therethrough to provide the gyro with a north-seeking action, wherein the second support means comprises a pair of gimbal shafts attached to the container in the normal direction of the extension of the spin axis of the gyro, a horizontal gimbal ring having a pair of bearings rotatably supporting the pair of gimbal shafts and a pair of horizontal shafts provided along an axis substantially perpendicular to the pair of gimbal shaft bearings, the horizontal ring being disposed outside of the container, a follow-up ring having a pair of bearings rotatably supporting the pair of horizontal shafts and a pair of normally vertical follow-up shafts along an axis substantially perpendicular to the pair of horizontal shaft bearings, the following-up ring being disposed outside of the horizontal ring, and a binnacle having a pair of bearings rotatably supporting the pair of follow-up shafts.

3. A gyro compass comprising a gyro case housing therein a gyro with its spin axis being held substantially horizontal, a container surrounding the gyro case and containing a liquid therein, first support means for supporting the gyro case in the container, second support means for supporting the container with three degrees of freedom, and servo means for causing the container to follow up the gyro case about an axis in a direction of gravity, characterized in that the gyro case is adapted so that its weight is greater than the buoyancy applied thereto by the liquid; the center of buoyancy is coincident with its center of gravity; the first support means comprises a flexible suspension member; the suspension member coupling the upper inside of the container with the gyro case so that the latter acts as a pendulum in the container; and the coupling point of the suspension member with the gyro case is positioned higher than the center of gravity of the gyro case, whereby torque proportional to the inclination of the spin axis of the gyro relative to a horizontal plane and also proportional to the residual weight of the gyro case is produced about an axis perpendicular to a plane including the spin axis of the gyro and a line of gravity therethrough to provide the gyro with a north-seeking action, wherein the second support means comprises a pair of horizontal shafts attached to the outer surface of the container along an axis perpendicular to a plane including the spin axis of the gyro and a line of gravity therethrough, a follow-up ring having a pair of bearings rotatably supporting the pair of horizontal shafts and a pair normally normall vertical follow-up shafts provided along an axis perpendicular to the pair of horizontal shaft bearings, the follow-up ring being disposed outside of the container, a first gimbal ring having a pair of bearings rotatably supporting the pair of follow-up shafts and a pair of normally horizontal first gimbal shafts along an axis substantially perpendicular to the pair of follow-up shaft bearings, the first gimbal ring being disposed outside of the follow-up ring, a second gimbal ring having a pair of first bearings rotatably supporting the pair of first gimbal shafts and a pair of second gimbal shafts provided along an axis substantailly perpendicular to the pair of first gimbal shaft bearings, the second gimbal ring being disposed outside of the first gimbal ring, and a binnacle having a pair of second bearings rotatably supporting the pair of second gimbal shafts.

4. A gyrocompass comprising a gyro case housing therein a gyro with its spin axis being held substantially horizontal, a container surrounding the gyro case and containing a liquid therein, first support means for supporting the gyro case in the container, second support means for supporting the container with the three degrees of freedom, and servo means for causing the container to follow up the gyro case about an axis in a direction of gravity, the first support means being formed of a flexible suspension member, the suspension member coupling the upper inside of the container with the gyro case so that the latter acts as a pendulum in the container, the coupling point of the suspension member with the gyro case being positioned higher than the center of gravity of the gyro case, a means for detecting displacement of the gyro case in a direction of the spin axis of the gyro relative to the container is provided between the container and the gyro case, whereby the pendulum, the liquid, the container and the displacement detecting means form an accelerometer for detecting the inclination of the spin axis of the gyro relative to the horizontal plane, a follow-up error is produced in the servo means due to the displacement, and the suspension member is twisted corresponding to the follow-up error and thereby apply torque to the gyro case corresponding to the twisting of the suspension member to provide the gyro with a damping action.

5. A gyrocompass according to claim 4, wherein the liquid is selected to have a viscosity which causes the time constant of said accelerometer to be greater than several seconds.

6. A gyrocompass according to claim 4, wherein said first support means consists of three suspension wires and one support member, the gyro case is suspended by two of the three suspension wires at two points on its outer surface, the free ends of said two suspension wires are fixed to the support member, respectively, and the support member is supported by the third suspension wire.

7. A gyrocompass as claimed in claim 6, wherein the support member of the first support means has a plate spring which is pre-loaded.

8. A gyro compass as claimed in claim 4, wherein the means for detecting displacement of the gyro case in the direction of its spin axis relative to the container is an electromagnetic pickup means.

9. A gyrocompass as claimed in claim 4, wherein the means for detecting displacement of the gyro case in the direction of its spin axis relative to the container is a photoelectric pickup means.

10. A gyrocompass as claimed in claim 4 further comprising a horizontal follow-up servo device which acts to make the container follow-up the gyro case about the horizontal axis.

* * * * *